United States Patent
Yuen

(10) Patent No.: US 7,812,549 B2
(45) Date of Patent: Oct. 12, 2010

(54) REMOTE DIMMABLE ENERGY-SAVING DEVICE FOR FLUORESCENT LAMPS

(75) Inventor: Edmond Yuen, Lindfield (AU)

(73) Assignee: Erg Shenzhen Ltd., Guangdong (CN)

( * ) Notice: Subject to any disclaimer, the term of this patent is extended or adjusted under 35 U.S.C. 154(b) by 228 days.

(21) Appl. No.: 12/090,483

(22) PCT Filed: Oct. 27, 2006

(86) PCT No.: PCT/AU2006/001605

§ 371 (c)(1),
(2), (4) Date: Apr. 17, 2008

(87) PCT Pub. No.: WO2007/048199

PCT Pub. Date: May 3, 2007

(65) Prior Publication Data

US 2008/0284356 A1    Nov. 20, 2008

(30) Foreign Application Priority Data

Sep. 27, 2006    (AU) ............................. 2006100833

(51) Int. Cl.
*H05B 37/02*    (2006.01)
(52) U.S. Cl. ............... 315/291; 315/307; 315/DIG. 4
(58) Field of Classification Search ........... 315/291, 315/294, 295, 296, 297, 307, 308, 247, 246
See application file for complete search history.

(56) References Cited

U.S. PATENT DOCUMENTS

| 7,307,389 B2 * | 12/2007 | Vakil et al. .................. 315/291 |
| 7,429,828 B2 * | 9/2008 | Cleland et al. ............. 315/157 |
| 7,573,372 B2 * | 8/2009 | Mogilner et al. ....... 340/310.11 |
| 2003/0090889 A1 | 5/2003 | Wacyk et al. |
| 2003/0209999 A1 | 11/2003 | Hui et al. |
| 2004/0196140 A1 | 10/2004 | Sid |
| 2004/0239263 A1 | 12/2004 | Vakil et al. |

FOREIGN PATENT DOCUMENTS

CN    2754242 Y    1/2006

OTHER PUBLICATIONS international Search Report of PCT/AU2006/001605, dated Dec. 14, 2006.

* cited by examiner

*Primary Examiner*—David Hung Vu

(57) ABSTRACT

A remote dimmable energy-saving device (fluorescent lamp) (20) comprises a remote control transmitter and a dimmable electronic ballast (30) with a built-in remote control receiver (38), wherein said receiver and the dimmable electronic ballast are integrated together and arranged in the T4/T5 tube adapter for T8/T10 tube batten or a fluorescent tube batten. A signal processing circuit of the remote control receiver (37) and a ballasting control circuit (35) of the dimmable electronic ballast are integrated into a single dimming control integrated circuit to control the lamp brightness to any level in the full brightness range.

8 Claims, 7 Drawing Sheets

REMOTE DIMMABLE ENERGY-SAVING DEVICE FOR FLUORESCENT LAMPS

1. FIELD OF THE INVENTION

This invention relates to dimmable fluorescent lamps. More specifically, it relates to a remote dimmable energy-saving device and a remote dimmable energy-saving fluorescent lamp thereof.

2. BACKGROUND OF THE INVENTION

Fluorescent lamps are widely used in homes, offices, schools and public buildings because of their high brightness and low cost.

The traditional fluorescent lamp generally comprises a shell, a magnetic ballast, a fluorescent tube, a batten and a starter switch.

The control switch, connected to the fluorescent lamp via a wire, is generally installed on the wall. To turn on or off the lamp, it is necessary to be physically at or near the location of the switch. A simple task no doubt, but consumers these days expect minimum inconvenience and maximum comfort in the daily appliances used, including lamps that can be dimmed or brightened with ease to suit the activities at hand.

Currently, there are a couple of products from our research that try to meet these needs and expectations.

One such product is the remote dimmable control by wiring between a vary voltage device and a remote electronic ballast that has a potentiometer adjuster or dimmer contained in its power supply circuit. Even it services the purpose of changing the brightness of the fluorescent lamp, the adjustment of the desired brightness of the lamp is not convenient. It must be performed by hand on the voltage vary device and usually the usage is limited to electrical professionals who design the wiring and installation by themselves.

There is another kind of dimmable fluorescent lamp that utilizes an infrared remote controller for brightness adjustment. It was found that the brightness levels of these fluorescent lamps are predefined and fixed. Thus, this kind of fluorescent lamp is still inconvenient for the consumers and cannot meet the expectations and requirements.

3. BRIEF SUMMARY OF THE INVENTION

The objective of the present invention is to provide a remote dimmable energy-saving device and a remote dimmable energy-saving T4/T5 fluorescent lamp thereof, to adjust a brightness of the lamp tube to any brightness level in the full brightness range.

According to one aspect of the present invention, a remote dimmable energy-saving device is provided, the device comprising a dimmable electronic ballast, also comprising a remote control transmitter and a remote control receiver working with said remote control transmitter to control the brightness adjustment of the dimmable electronic ballast via a remote control manner, wherein the remote control receiver is integrated with the dimmable electronic ballast, and assembled in a fluorescent tube batten or a T4/T5 tube adapter for a T8/T10 tube batten.

Advantageously, a signal processing circuit of the remote control receiver and a ballasting control circuit of the dimmable electronic ballast are integrated into a single dimming control integrated circuit (IC), comprising:

A decoding circuit that is adapted to decode a received dimming signal;

A D/A converting circuit that is adapted to convert a digital dimming signal outputted from the decoding circuit into an analog dimming signal;

A dimming interface that is adapted to receive the analog dimming signal and provide a reference phase;

A phase control circuit that is adapted to compare the reference phase with the detected actual phase and generate an error signal;

A voltage controlled oscillator (VCO) that is adapted to change an oscillating frequency so as to drive the error signal to zero;

A half bridge driving circuit that is driven by a output of the VCO, thereby providing high HO and low LO outputs to a half bridge electronic switches.

Advantageously, said dimming control integrated circuit controls the brightness level in the full brightness range of the lamp tube.

Advantageously, said remote control transmitter comprises a coding circuit and a transmitting circuit, encoding a dimming setting from users and then transmitting out via a wireless manner.

Advantageously, said remote control transmitter further comprises a first channel and/or ID selection circuit, which is adapted to setup various channels and/or IDs by a user to encode the dimming signal; said single dimming control integrated circuit further comprises a second channel and/or ID selection circuit, which is adapted to select a corresponding channel and/or ID according to the setting of the remote control transmitter, to decode the received dimming signal.

According to another aspect of the present invention, a remote dimmable energy-saving fluorescent lamp is provided, said fluorescent lamp comprising a T4/T5 fluorescent tube, a T4/T5 tube adapter, a tube batten and a dimmable electronic ballast, said fluorescent lamp further comprising a remote control transmitter and a remote control receiver working with said remote control transmitter to control the brightness adjustment of the dimmable electronic ballast via a remote control manner, wherein the remote control receiver is integrated with the dimmable electronic ballast, and assembled in the tube batten or the T4/T5 tube adapter for the T8/T10 tube batten.

Advantageously, a signal processing circuit of the remote control receiver and a ballasting control circuit of the dimmable electronic ballast are integrated into a single dimming control integrated circuit (IC), comprising:

A decoding circuit that is adapted to decode a received dimming signal;

A D/A converting circuit that is adapted to convert a digital dimming signal outputted from the decoding circuit into an analog dimming signal;

A dimming interface that is adapted to receive the analog dimming signal and provide a reference phase;

A phase control circuit that is adapted to compare the reference phase with the detected actual phase and generate an error signal;

A voltage controlled oscillator (VCO) that is adapted to change an oscillating frequency so as to drive the error signal to zero;

A half bridge driving circuit that is driven by a output of the VCO, thereby providing high HO and low LO outputs to a half bridge electronic switches.

Advantageously, said dimming control integrated circuit controls the brightness level in the full brightness range of the lamp tube.

Advantageously, said remote control transmitter comprises a coding circuit and a transmitting circuit, encoding a dimming setting from users and then transmitting out via a wireless manner.

Advantageously, said remote control transmitter further comprises a first channel and/or ID selection circuit, which is adapted to setup various channels and/or IDs by a user to encode the dimming signal; said single dimming control integrated circuit further comprises a second channel and/or ID selection circuit, which is adapted to select a corresponding channel and/or ID according to the setting of the remote control transmitter, to decode the received dimming signal.

The advantages of the present invention are as following:

The present invention can utilize various controls using the integrated circuit, including infrared control, RF control and simple wired box control.

For infrared control, 5 meters is the effective operation range, thus general indoor lighting requirements can be satisfied. Users can conveniently adjust and control brightness of the fluorescent lamp, pointing to the infrared receiver, in any positions in the room. With the subject remote dimmable energy-saving fluorescent lamp according to the present invention, users can adjust any brightness level of the lamp from 0% to 100% of the full brightness range based on desired requirements or situations. Thus this fluorescent lamp system can save energy and produce the right level of light for a comfortable environment. The present invention can avoid interferences between the remote controller and different lamp tubes under control, by setting different channels and/or IDs for different fluorescent lamps. Further, one remote controller can control different sets of fluorescent lamps for different brightness level by the channel setting.

4. BRIEF DESCRIPTION OF THE DRAWINGS

With the attached drawings and embodiments, together with the following descriptions, this invention will be expressed as follows. As refer to the attached figures.

5. DETAILED DESCRIPTION OF THE PREFERRED EMBODIMENT

A removable adapter set for T4/T5 fluorescent tube is disclosed in China patent application NO. 200420095740.X filed on Nov. 11, 2004, titled with "Adapter structure for a batten of fluorescent lamp", wherein one end of the adapter connects to the batten for T8 tube, and the other end of the adapter connects to T4/T5 tube, thus the existing batten for T8 tube can match with T4/T5 tube without any change to the batten structure or the circuit. The present invention provides a remote dimmable energy-saving device for fluorescent lamp and a remote dimmable energy-saving fluorescent lamp thereof on the basis of the adapter. Said remote dimmable energy-saving device comprises a remote control transmitter and a dimmable electronic ballast with a built-in remote control receiver, wherein said receiver and the dimmable electronic ballast are integrated together and contained in the T4/T5 tube adapter for T8/T10 lamp batten or assembled as a unit in a fluorescent tube batten. A signal processing circuit of the remote control receiver and a ballasting control circuit of the dimmable electronic ballast are integrated into a single dimming control integrated circuit (IC). The signal received by the remote control receiver is to process, convert to analog signal/dimming signal and will be used to change the light intensity level of the lamp. The remote dimmable energy-saving device of the present invention may utilize various wireless control manners, such as infrared or radio frequency and a simple control box similar to size of the general switch box by simple wiring.

Figure 1:
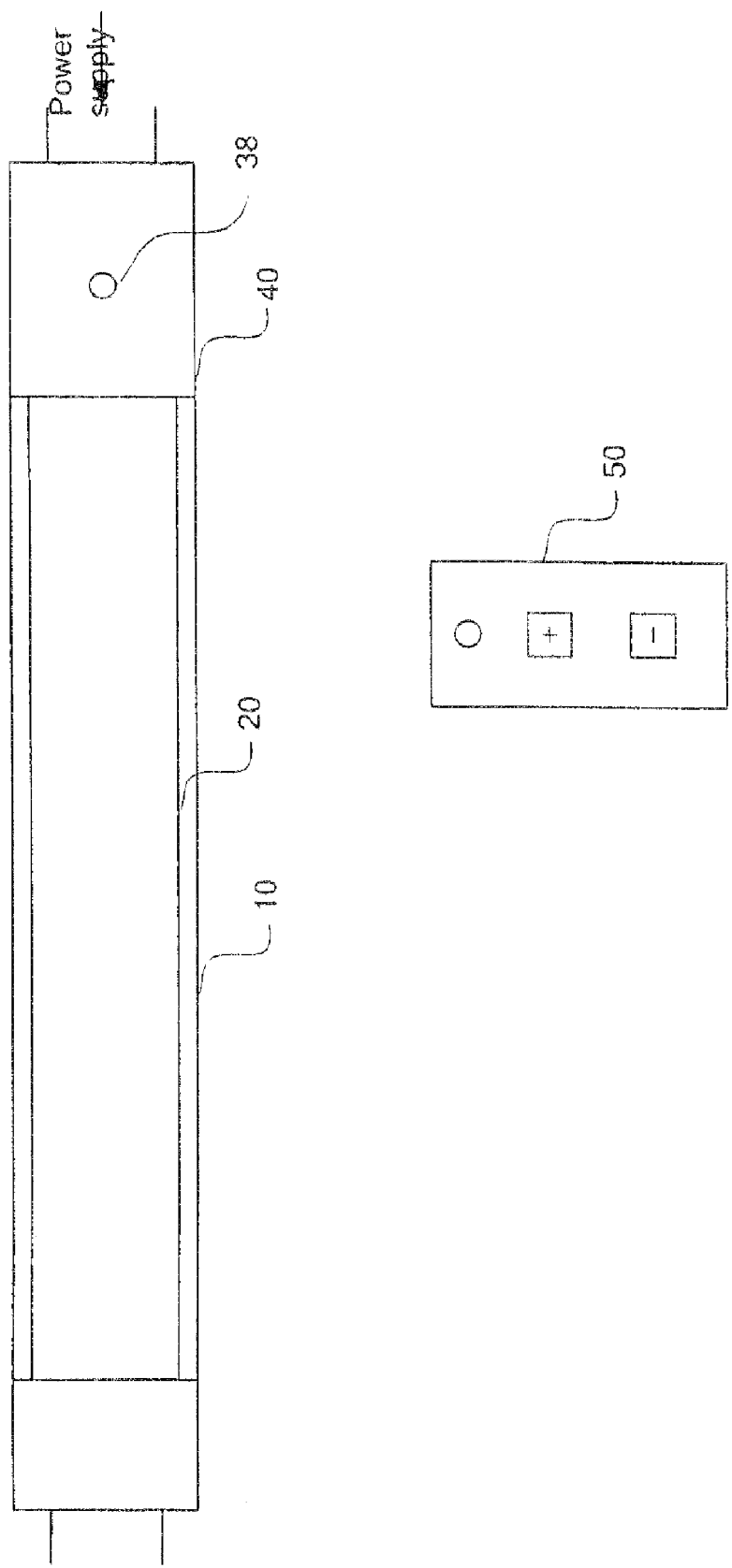
FIG. 1 is a structural diagram of the remote dimmable energy-saving fluorescent lamp in accordance with one embodiment of the invention.

FIG. 1 is a structural diagram of the remote dimmable energy-saving fluorescent lamp in accordance with one embodiment of the invention. As shown in FIG. 1, the fluorescent lamp comprises a batten 10, a T4/T5 fluorescent tube 20, an adapter for T4/T5 tube 40, a signal receiver 38 and a remote control transmitter 50. The remote control transmitter 50 may utilize infrared or radio frequency technologies, on which brightness adding, subtracting buttons and/or ON/OFF button for users to adjust brightness of the fluorescent lamp are provided. Alternatively, a knob is provided on the remote control transmitter 50. One end of the adapter for T4/T5 tube 40 connects to T4/T5 tube 20, and the other end of the adapter is inserted into the holder of the lamp batten. The IC 30 of the dimmable electronic ballast and the remote control receiver (not shown in FIG. 1) are mounted in the adapter for T4/T5 tube 40. The signal receiver 38 (e.g. infrared sensor or RF receiving antenna) is installed outside of the adapter for T4/T5 tube 40, to receive the dimming signal transmitted by the remote control transmitter 50. Then the dimming signal is processed by the dimmable electronic ballast to drive the brightness adjustment of the fluorescent tube 20.

Figure 2:
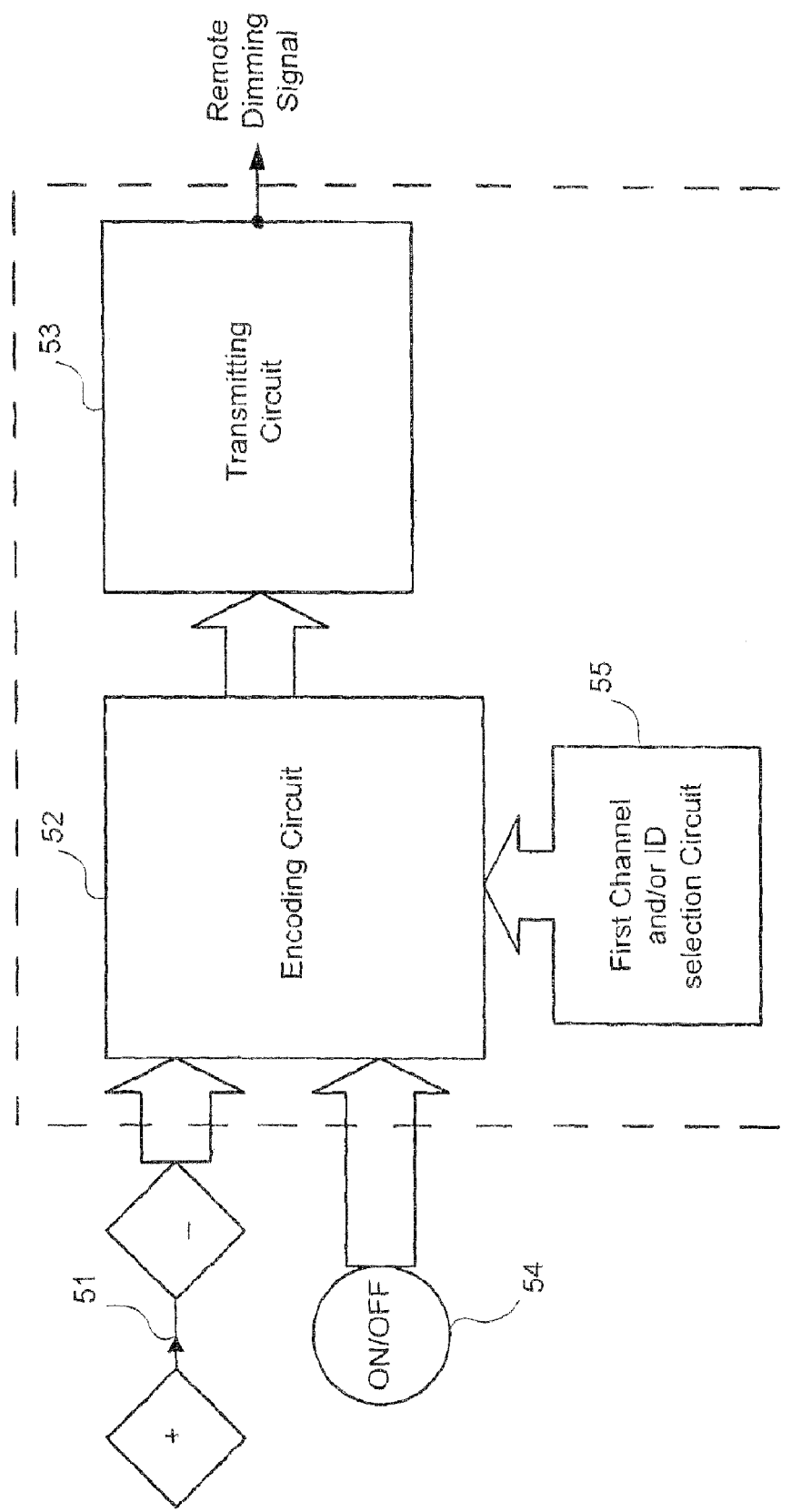
FIG. 2 is a block diagram of the remote control transmitter in accordance with one embodiment of the invention.

Specifically, FIG. 2 is a structural diagram of the remote control transmitter 50 of the fluorescent lamp in accordance with the invention. As shown in FIG. 2, the remote control transmitter 50 comprises dimming buttons 51, ON/OFF buttons 54, an encoding circuit 52 and a transmitting circuit 53. Users can adjust the fluorescent lamp to any brightness level in the full brightness range through the dimming buttons 51. The user inputs are then encoded by the encoding circuit 52 according to a respective manner, and transmitted by the transmitting circuit 53 in an infrared manner, or transmitted by an antenna coupled to the transmitting circuit 53 in a RF manner. In order to avoid interference of the remote control signals between various devices in a room, the remote control transmitter 50 further comprises a first channel and/or ID selection circuit 55 that is adapted to select a suitable channel, with which the dimming inputs from a user are encoded before transmitted. Then the encoded dimming inputs are transmitted in the selected channel. The remote control transmitter 50 may use the first channel and/or ID selection circuit 55 to input a ID corresponding to the fluorescent tube that is to be adjusted, or to select a preset ID corresponding to the fluorescent tube to be adjusted. Then the dimming inputs from a user are encoded with the ID of the fluorescent tube to be adjusted, and transmitted through the transmitting circuit 53. Thus, a single remote control transmitter can adjust a plurality of fluorescent lamps having different IDs.

Figure 3:
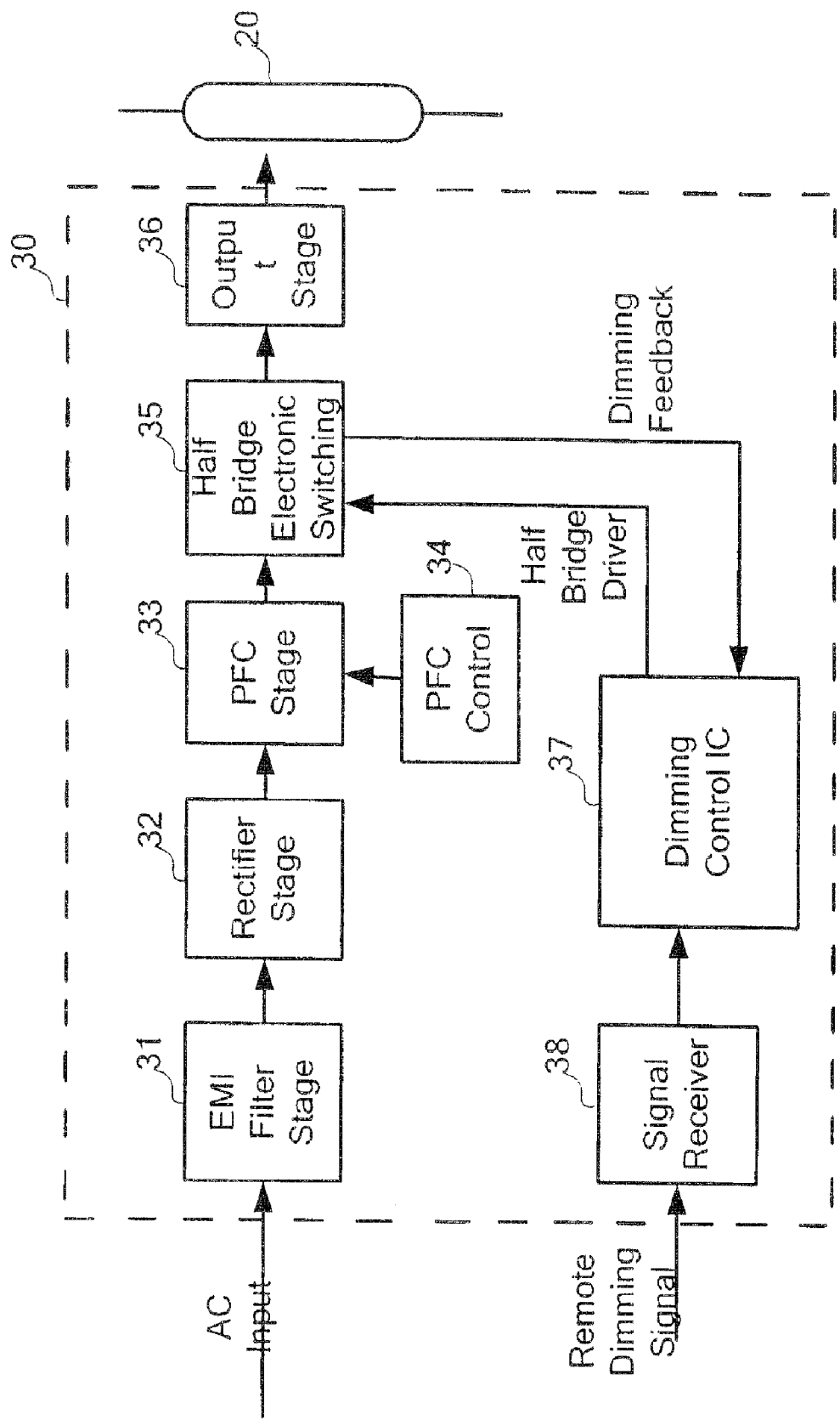
FIG. 3 is a block diagram of the dimmable electronic ballast in accordance with one embodiment of the invention.
Figure 4:
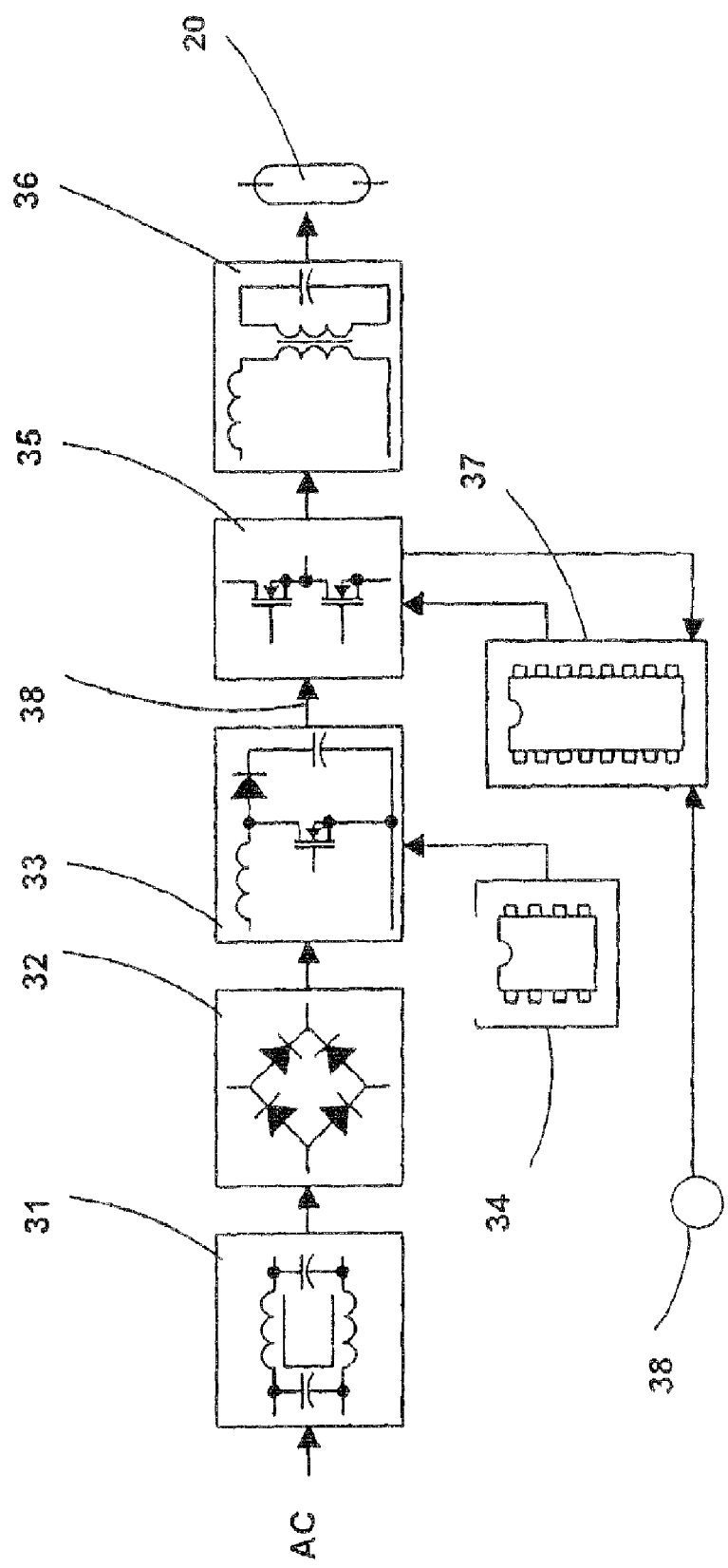
FIG. 4 is circuit diagram of the dimmable electronic ballast in accordance with one embodiment of the invention.

FIG. 3 and FIG. 4 are respectively structural and circuit diagrams of the dimmable electronic ballast 30 integrated with a remote control receiver in accordance with one embodiment of the invention. As shown in the figures, in the dimmable electronic ballast 30, firstly the AC input is filtered by an EMI filter stage 31, which utilizes suitable capacitors and inductors well known to those of skill in the art to minimize the EMI. Then, the output of the EMI filter stage is provided to a rectifier stage 32, for example a full wave rectifier. The rectified DC output of the rectifier stage 32 is then provided to a power factor correction (PFC) stage 33. The power factor correction stage 33 uses a boost converter circuit to increase the voltage from the rectifier 32 up to a DC bus voltage. Further, the power factor correction stage 33 shapes the waveform to minimize the phase shift of current and voltage at the AC input line, preferably maintaining a power factor near 1. The power factor correction stage 33 is controlled by a power factor correction controller in a conventional manner. Then the DC bus voltage is provided to a half bridge electronic switching stage 35, which utilizes high side and low side switches to provide voltage necessary for driving the fluorescent tube. Operation of the half bridge electronic switching stage 35 is driven by dimming control IC 37. The output from the half bridge electronic switching stage 35 is provided to an output stage 36, which comprises a resonant LC circuit composed of a resonant inductor and a resonant capacitor. The T4/T5 fluorescent tube 20 is coupled to the output stage 36 and then powered by it.

Figure 5:
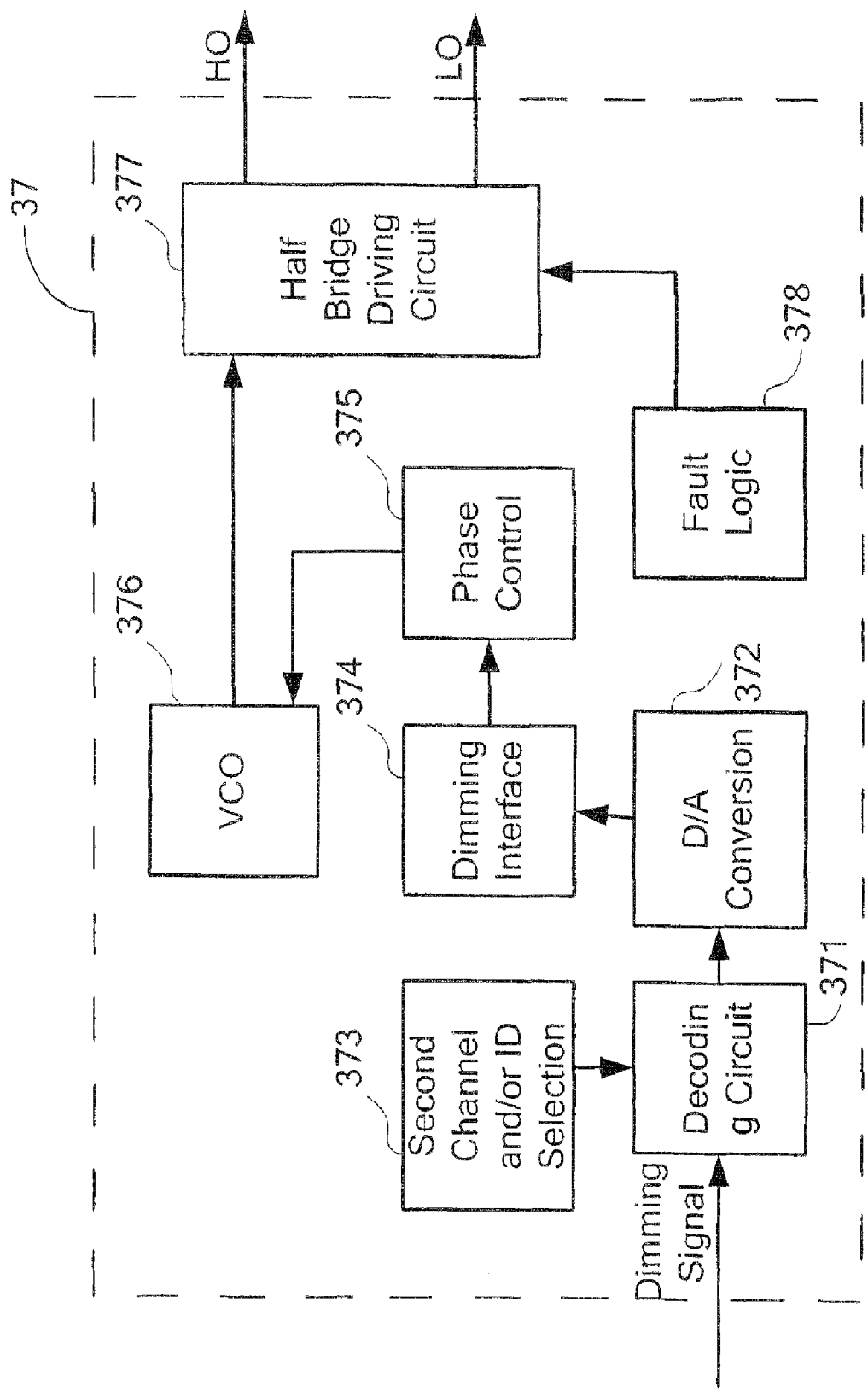
FIG. 5 is a block diagram of the dimming control integrated circuit in accordance with one embodiment of the invention.

As shown in FIG. 4, the dimming control IC 37 may be a single IC with integrated dimming signal processing circuit and ballasting control circuit, receiving a remote dimming signal transmitted by the remote control transmitter from the signal receiver 38 (e.g., infrared sensor or RF antenna) and processing the signal. The specific structure of the dimming control IC 37 is shown in FIG. 5, wherein the dimming control IC 37 comprises a decoding circuit 371 that is adapted to decode the received dimming signal and then provide it to a D/A converting circuit 372, which converts the decoded digital dimming signal into analog dimming signal. The dimming control IC 37 further comprises a second channel and/or ID selection circuit 373 that is adapted to select a channel corresponding to the remote control transmitter for decoding the received dimming signal. Alternatively, The second channel and/or ID selection circuit 373 may use a corresponding ID preset in it for decoding the received dimming signal, while ignoring the signals that are not corresponding to the selected channel or ID.

The dimming control IC 37 also comprises a dimming interface 374, which receives the analog dimming signal from the D/A converting circuit 372, and provides a reference phase to a phase control circuit 375. The phase control circuit 375 determines the actual phase of the output current by detecting the zero crossing of the voltage signal proportional to the current of the output stage 36. The phase control circuit 375 then compares the reference phase as provided by the dimming interface 374 and the detected actual phase to obtain a phase error, and provides the error signal to the VCO 376 thereby altering the VCO frequency to drive the error signal to zero. The half bridge driving circuit 377 is driven by the output of the VCO 376, to provide the high HO and low LO signals to the high side and low side switched of the half bridge electronic switching circuit 35 respectively. Then the output of the half bridge electronic switching circuit 35 is provided to the output stage 36 at the common connection point between the high side and low side switches for adjusting the power of the fluorescent tube 20.

Figure 6:
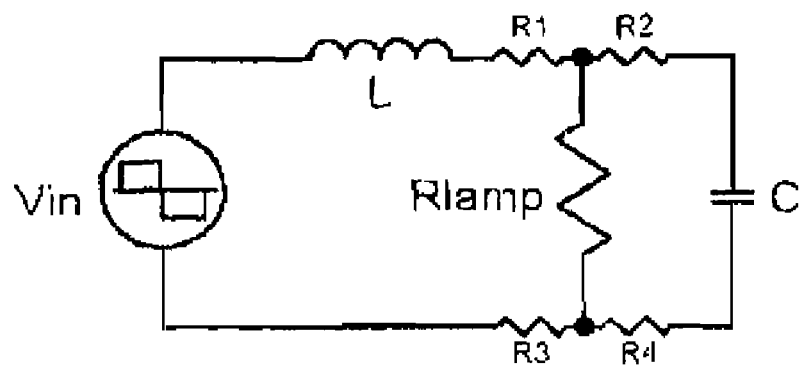
FIG. 6 is sketched diagram of the output stage of the ballast in accordance with one embodiment of the invention.
Figure 7:
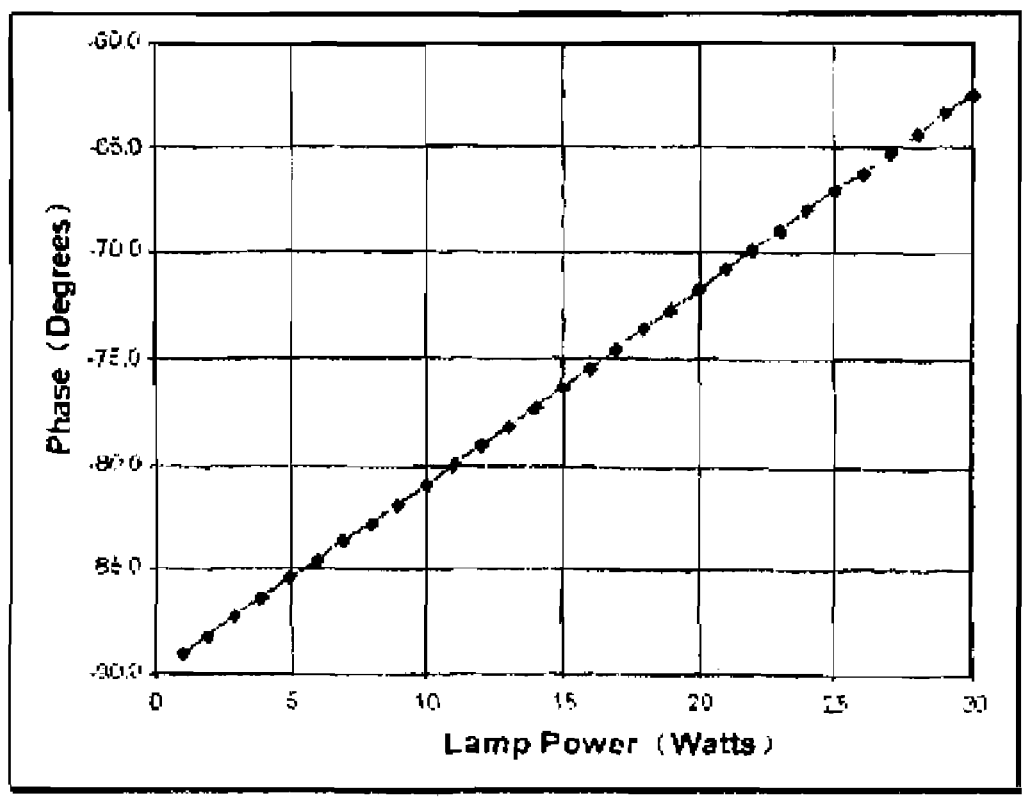
FIG. 7 shows changes of the power of the fluorescent lamp relative to the phase angle between the current and voltage provided to the fluorescent lamp.

FIG. 6 shows a model of the output stage 36, for further describing the phase control. The fluorescent lamp and its filament are represented by resistors, with the lamp resistance $R_{lamp}$ inserted between the filament resistances ($R_1$, $R_2$, $R_3$ and $R_4$). According the transferring function (1) for the input current relative to the input voltage of the output stage, we see that the contribution of the filament resistances is negligible compared to the resistance of the lamp, and become even more negligible as the resistance of the lamp increase. Solving for the function (2), the phase angle of the output stage current yields, $$\frac{I_{in}(s)}{V_{in}(s)} = \frac{1 + (R_{Lamp} + R_2 + R_4)Cs}{(sL + R_{Lamp} + R_1 + R_3)[1 + (R_{Lamp} + R_2 + R_4)Cs] - R_{Lamp}^2 Cs} \quad (1)$$

$$\varphi = \frac{360}{2\pi}\tan^{-1}\left[\left(\frac{V_\%^2}{2P_\%}C - \frac{2P_\%}{V_\%^2}L\right)2\pi f_\% - 4\frac{V_\%^2}{P_\%}LC^2\pi^3 f_\%^3\right] \quad (2)$$

Wherein L is output stage inductor, C is output stage capacitor, $P_{o\%}$ is lamp power, $f_{o\%}$ is lamp voltage amplitude at lamp power %. According to the function (2), we see that there is a linear change relating the lamp power to the phase angle between the current and voltage provided to the lamp, as shown in FIG. 7, wherein the lower the phase angle, the greater the power. Therefore, when the phase of the lamp voltage is more close to the phase of the lamp current, the power consumption in the lamp will increase, thus brightness of the lamp increases; when the phase angle between the current and voltage increases, the power consumption in the lamp decreases, thus brightness of the lamp decreases. The linear relationship of the lamp power and the phase angle between the current and voltage of the lamp can be utilized to realize a closed loop dimming control.

Figure 8:
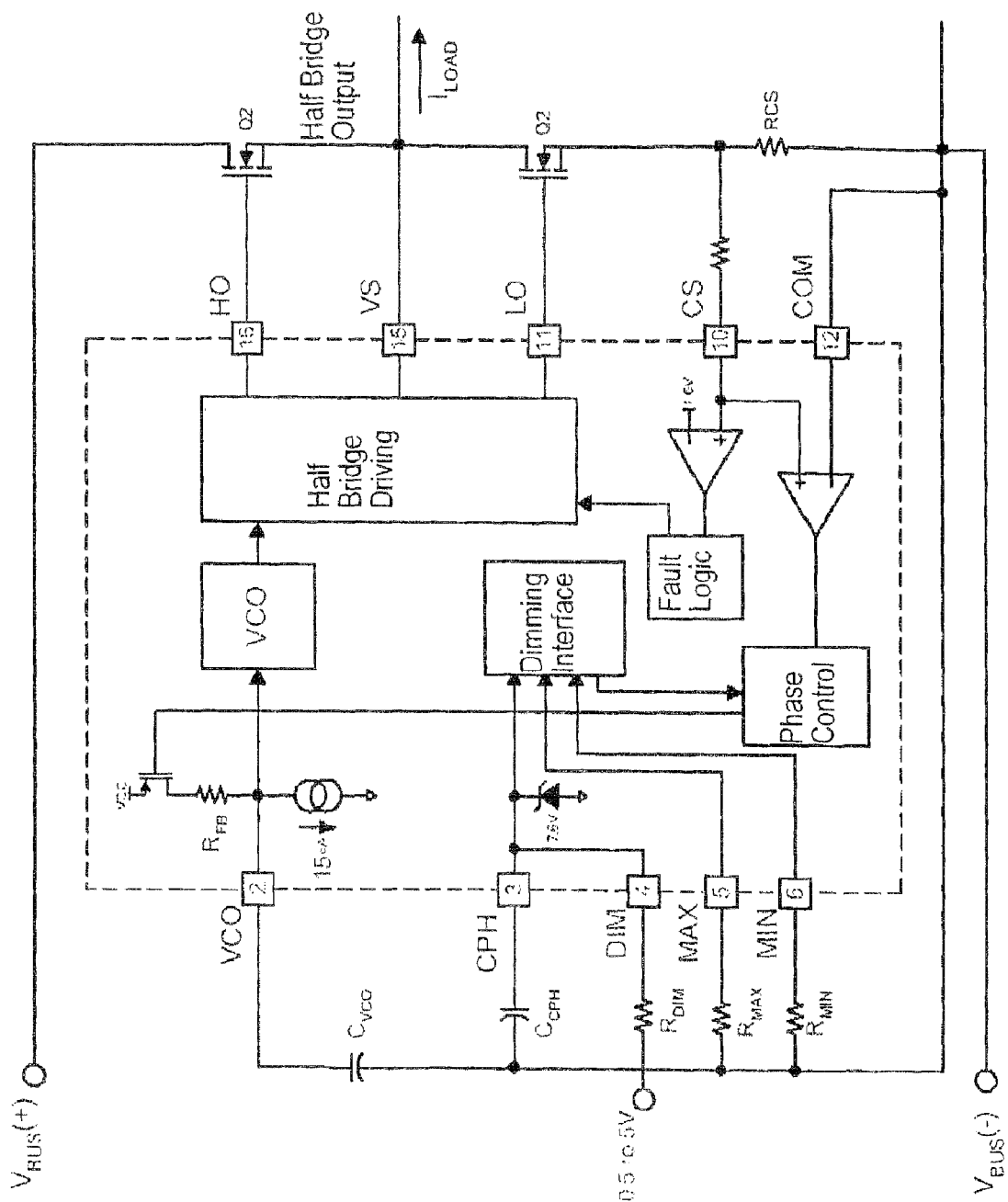
FIG. 8 is a circuit diagram of the ballasting control portion in the dimming control IC as shown in FIG. 5.

FIG. 8 is a sketched circuit diagram of the ballasting control portion in the dimming control IC in FIG. 5. As shown in the figure, the maximum and minimum lamp power is set from pins MAX and MIN of the dimming interface respectively. A dimming input pin DIM provides 0.5V~5V direct voltage, wherein 5V is corresponding to the minimum phase (i.e. maximum lamp power). The minimum phase (maximum power) corresponding to 5V input of the pin DIM is defined by a external coupled resistor of the pin MAX, and the maximum phase (minimum power) corresponding to the 0.5V input of the pin DIM is defined by a external coupled resistor of the pin MIN. Output voltage of the dimming interface is compared with voltage of a timing capacitor in the dimming interface, thereby a reference phase is generated and provided to the phase control circuit.

In FIG. 8, a pin CS provides current detection input; voltage at pin CS has a zero crossing point proportional with the phase angle between current and voltage of the lamp. The actual phase of the lamp can be obtained by detecting the zero crossing point at pin CS. Then a feedback control to the dimming power level can be realized by comparing the zero crossing point (the actual phase) with the reference phase received by the dimming signal input pin DIM. As described above, the actual phase is compared with the preset reference phase by a phase comparator in the phase control circuit. A phase error between the reference phase and the actual phase cause the frequency of the VCO changed, thus the phase error is driven to zero. The VCO is connected with an internal 15 μA power supply, which discharge to a capacitor $C_{VCO}$ external coupled to the VCO during the dimming operation, thereby the oscillating frequency is decreased to a locked value, and the half bridge driving circuit is driven to provide HO and LO outputs to the high side and low side switches. Thus the fluorescent lamp is driven to a desired brightness. Therefore, the remote dimmable energy-saving device of the present invention can adjust the lamp to any brightness level in the full brightness range; that is to say, the brightness of the lamp can be adjusted to any value from 0% to 100%, to satisfy different requirements of different users. Further, the power consumption is saved.

As shown in FIG. 5 and FIG. 8, the dimming control IC further comprises a fault logic 378. During dimming operation, a current in the half bridge electronic switching circuit that is proportional with lamp current is detected at the current detection pin CS, then the signal is provided to the fault logic 378. When an over current is detected, the fault logic can shut down the half bridge driving circuit, the pins HO and LO. Additionally, a over-temperature detection and a under-voltage detection are provided in the IC as inputs to the fault logic 378 to allowing shutting down the half bridge driving circuit, the pins HO and LO in the event of over-temperature or under-voltage.

What is claimed is:

1. A remote dimmable energy-saving device, which comprises a dimmable electronic ballast, characterized in that further comprising a remote control transmitter and a remote control receiver working with said remote control transmitter to control the brightness adjustment of the dimmable electronic ballast via a remote control manner, wherein said remote control receiver is integrated with the dimmable electronic ballast and assembled in a fluorescent tube batten or a T4/T5 tube adapter for a T8/T10 tube batten.

2. The remote dimmable energy-saving device of claim 1, wherein a signal processing circuit of the remote control receiver and a ballasting control circuit of the dimmable electronic ballast are integrated into a single dimming control integrated circuit (IC), comprising:
   A decoding circuit that is adapted to decode a received dimming signal;
   A D/A converting circuit that is adapted to convert a digital dimming signal outputted from the decoding circuit into an analog dimming signal;
   A dimming interface that is adapted to receive the analog dimming signal and provide a reference phase;
   A phase control circuit that is adapted to compare the reference phase with the detected actual phase and generate an error signal;
   A voltage controlled oscillator (VCO) that is adapted to change an oscillating frequency so as to drive the error signal to zero;
   A half bridge driving circuit that is driven by a output of the VCO, thereby providing high HO and low LO outputs to a half bridge electronic switches.

3. The remote dimmable energy-saving device of claim 2, wherein said dimming control integrated circuit controls the brightness level in the full brightness range of the lamp tube.

4. The remote dimmable energy-saving device of claim 1, wherein said remote control transmitter comprises a coding circuit and a transmitting circuit, encoding a dimming setting from users and then transmitting out via a wireless manner.

5. The remote dimmable energy-saving device of claim 4, wherein said remote control transmitter further comprises a first channel and/or ID selection circuit, which is adapted to setup various channels and/or IDs by a user to encode the dimming signal; said single dimming control integrated circuit further comprises a second channel and/or ID selection circuit, which is adapted to select a corresponding channel and/or ID according to the setting of the remote control transmitter, to decode the received dimming signal.

6. A remote dimmable energy-saving fluorescent lamp, comprising a T4/T5 fluorescent tube, a T4/T5 tube adapter, a tube batten and a dimmable electronic ballast, characterized in that said fluorescent lamp further comprising a remote control transmitter and a remote control receiver working with said remote control transmitter to control the brightness adjustment of the dimmable electronic ballast via a remote control manner, wherein the remote control receiver is integrated with the dimmable electronic ballast, and assembled in the tube batten or the T4/T5 tube adapter for the T8/T10 batten.

7. The fluorescent lamp of claim 6, wherein a signal processing circuit of the remote control receiver and a ballasting control circuit of the dimmable electronic ballast are integrated into a single dimming control integrated circuit (IC), comprising:
   A decoding circuit that is adapted to decode a received dimming signal;
   A D/A converting circuit that is adapted to convert a digital dimming signal outputted from the decoding circuit into an analog dimming signal;
   A dimming interface that is adapted to receive the analog dimming signal and provide a reference phase;
   A phase control circuit that is adapted to compare the reference phase with the detected actual phase and generate an error signal;
   A voltage controlled oscillator (VCO) that is adapted to change an oscillating frequency so as to drive the error signal to zero;
   A half bridge driving circuit that is driven by a output of the VCO, thereby providing high HO and low LO outputs to a half bridge electronic switches.

8. The fluorescent lamp of claim 7, wherein said dimming control integrated circuit controls the brightness level in the full brightness range of the lamp tube.

* * * * *